(12) United States Patent
Cheston et al.

(10) Patent No.: US 7,200,652 B2
(45) Date of Patent: Apr. 3, 2007

(54) METHOD AND SYSTEM FOR PROVIDING AUTOMATIC NOTIFICATION OF END OF LEASE OF COMPUTERS AND THEIR LOCATIONS

(75) Inventors: Richard Wayne Cheston, Morrisville, NC (US); Daryl Carvis Cromer, Apex, NC (US); Howard Jeffrey Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 09/906,518

(22) Filed: Jul. 16, 2001

(65) Prior Publication Data

US 2003/0014508 A1    Jan. 16, 2003

(51) Int. Cl.
*G06F 15/173* (2006.01)
*G06F 15/16* (2006.01)

(52) U.S. Cl. ........................................ 709/223; 705/28
(58) Field of Classification Search ................ 709/201, 709/203, 217, 219, 225, 229, 223, 224; 719/318; 379/100.06; 714/48; 707/10; 705/22, 28
See application file for complete search history.

(56) References Cited

U.S. PATENT DOCUMENTS 4,624,578 A  *  11/1986  Green .......................... 368/10
5,510,780 A      4/1996  Norris et al.

(Continued)

FOREIGN PATENT DOCUMENTS

EP        1 306 767 A1  *  2/2003

(Continued)

OTHER PUBLICATIONS

Riordan, Teresa "A new device helps emergency workers find people who use a mobile phone to call for help" Nov. 10, 1997; New York Times (Late Edition (East Coast)); p D.2.*

(Continued)

*Primary Examiner*—William Vaughn
*Assistant Examiner*—Philip Chea
(74) *Attorney, Agent, or Firm*—Gregory M. Doudnikoff; Dillon & Yudell LLP (57) ABSTRACT

A method and system for providing automatic notification of an end of lease of a computer system and its location within a computer network is disclosed. The computer network includes a server computer system and multiple client computer systems. A message is initially sent from the server computer system to all the client computer systems to inquire the lease status of each of the client computer systems. At each of the client computer systems, a determination is made as to whether or not a current date falls within a predetermined amount of days from the end of lease date for the client computer system. If the current date falls within the predetermined amount of days from the end of lease date for the client computer system, the physical location of the client computer system is obtained from a storage device located at an Ethernet wall plate to which the client computer system is attached. An alert message, which includes the physical location of the client computer system, is then generated by the client computer system. The alert message is subsequently transmitted from the client computer system to the server computer system.

6 Claims, 6 Drawing Sheets

U.S. PATENT DOCUMENTS

| | | | | |
|---|---|---|---|---|
| 5,650,770 | A * | 7/1997 | Schlager et al. | 340/573.1 |
| 5,664,113 | A * | 9/1997 | Worger et al. | 705/28 |
| 5,708,909 | A | 1/1998 | Yamashita et al. | |
| 5,732,401 | A | 3/1998 | Conway | |
| 5,764,892 | A * | 6/1998 | Cain et al. | 709/200 |
| 5,802,280 | A * | 9/1998 | Cotichini et al. | 709/200 |
| 5,893,904 | A | 4/1999 | Harris et al. | |
| 5,925,127 | A | 7/1999 | Ahmad | |
| 6,122,639 | A * | 9/2000 | Babu et al. | 707/103 R |
| 6,131,119 | A * | 10/2000 | Fukui | 709/224 |
| 6,134,665 | A | 10/2000 | Klein et al. | |
| 6,244,758 | B1 * | 6/2001 | Solymar et al. | 709/224 |
| 6,300,863 | B1 * | 10/2001 | Cotichini et al. | 340/5.8 |
| 6,405,236 | B1 * | 6/2002 | Nieratschker | 709/200 |
| 6,601,097 | B1 * | 7/2003 | Cheston et al. | 709/222 |
| 7,047,426 | B1 * | 5/2006 | Andrews et al. | 713/155 |
| 2001/0029474 | A1 * | 10/2001 | Yada | 705/28 |
| 2002/0046270 | A1 * | 4/2002 | Kochi et al. | 709/223 |
| 2002/0147601 | A1 * | 10/2002 | Fagan | 705/1 |
| 2003/0023516 | A1 * | 1/2003 | Sharrow et al. | 705/28 |

FOREIGN PATENT DOCUMENTS

| | | | |
|---|---|---|---|
| JP | 07-058714 | * | 3/1995 |
| JP | 07-234785 | * | 9/1995 |
| JP | 08-006784 | * | 1/1996 |
| JP | 08-181965 | * | 7/1996 |
| JP | 8-273015 | * | 10/1996 |
| JP | 9160969 | | 6/1997 |
| WO | WO 98/12656 | | 3/1998 |

OTHER PUBLICATIONS

Business Wire, "AltirisPremiers New Web Console for Managing PCs; First Product Announcement Following October Acquisition of Computing Edge", Nov. 29, 2000.*

Altiris, Notification Server 6.0 SP1 Help, 1998-2004.*

* cited by examiner

METHOD AND SYSTEM FOR PROVIDING AUTOMATIC NOTIFICATION OF END OF LEASE OF COMPUTERS AND THEIR LOCATIONS

BACKGROUND OF THE INVENTION

1. Technical Field

The present invention relates to a method and system for data processing in general, and in particular to a method and system for providing automatic notification. Still more particularly, the present invention relates to a method and system for providing automatic notification of an end of lease of a computer and its location.

2. Description of the Prior Art

More and more companies prefer computer leasing over purchasing. The lease term of a typical computer lease usually lasts approximately two, three, or four years. At the end of a computer lease, a company needs to return all the lease computers; otherwise, the company must continue to pay at the lease rate for any lease computers that have not been returned. The task of finding all the lease computers is usually quite straightforward when there are only a few lease computers. However, when there is a large number of lease computers, such as several thousand units, installed at various locations within a company, then the task of finding all the lease computers becomes daunting.

A database can be used to keep track of information such as whether or not a computer lease for a specific computer is about to expire, along with the location of the computer according to its first installation. However, computers tend to be relocated many times within a huge organization after their first installation, and yet the database is usually not updated after the relocation of computers. As a result, the database tracking method becomes very impractical. Consequently, it would be desirable to provide an improved method for providing automatic notification when a computer lease is about to expire, and for providing the location of the computer to which the computer lease belongs.

SUMMARY OF THE INVENTION

In accordance with a preferred embodiment of the present invention, a computer network includes a server computer system and multiple client computer systems. A message is initially sent from the server computer system to all the client computer systems to inquire the lease status of each of the client computer systems. At each of the client computer systems, a determination is made as to whether or not a current date falls within a predetermined amount of days from the end of lease date for the client computer system. If the current date falls within the predetermined amount of days from the end of lease date for the client computer system, the physical location of the client computer system is obtained from a storage device located at an Ethernet wall plate to which the client computer system is attached. An alert message, which includes the physical location of the client computer system, is then generated by the client computer system. The alert message is subsequently transmitted from the client computer system to the server computer system.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a midrange computer or a mainframe computer. In addition, the computer is preferably part of a network such as a local-area network (LAN) or a wide-area network (WAN).

Figure 1:
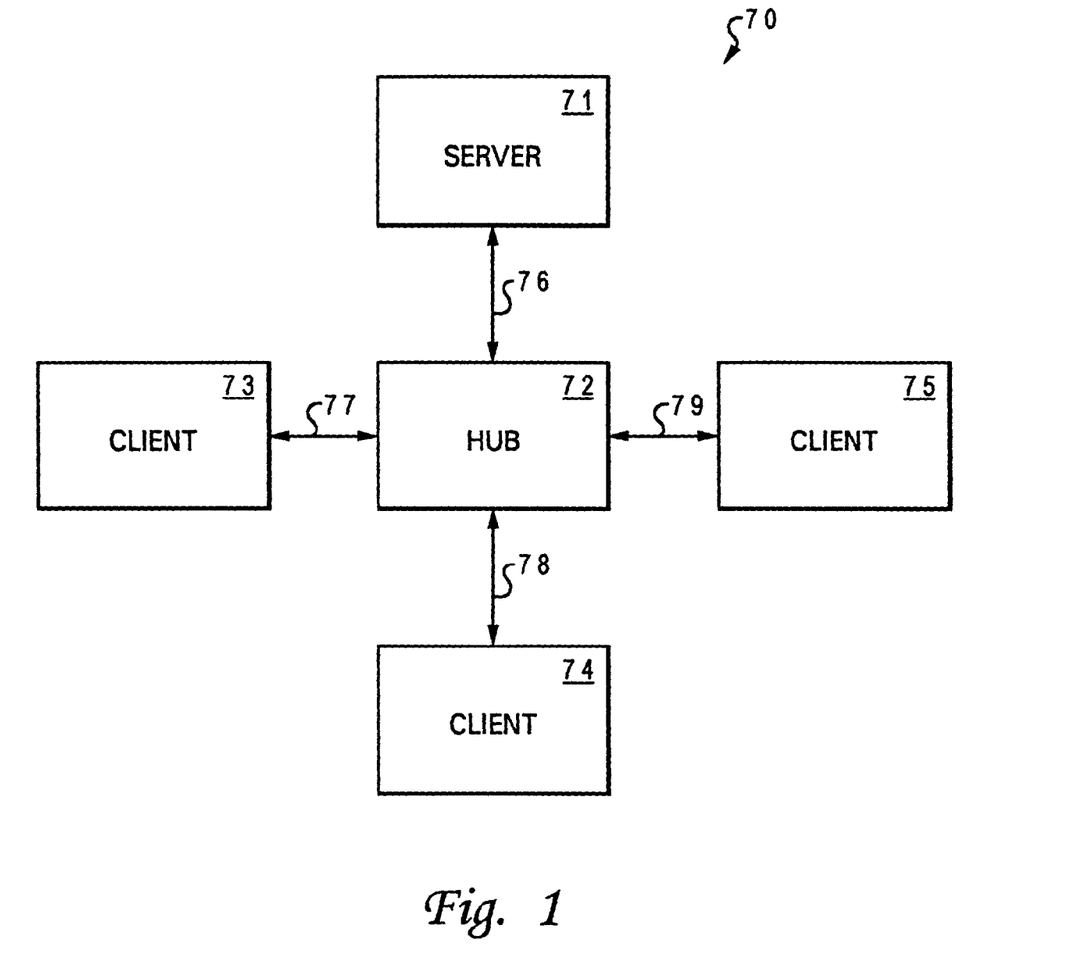
FIG. 1 is a block diagram of a computer network, in accordance with a preferred embodiment of the present invention.

Referring now to the drawings and in particular to FIG. 1, there is depicted a block diagram of a computer network, in accordance with a preferred embodiment of the present invention. As shown, a computer network 70 includes a server computer system 71, a hub 72, and client computer systems 73–75. Server computer system 71 is connected to hub 72 via a local-area network (LAN) bus 76. Similarly, client computer systems 73–75 are connected to hub 72 via LAN buses 77–79, respectively. The operation of computer network 70 preferably conforms to the Ethernet specification as it is well-known to those in the art. Computer network 70 may include any type of data communications channel, such as an Ethernet network, token ring, or X.10 or X.25. Those skilled in the art will recognize that the invention described herein may be implemented utilizing any type of data communications channel.

Figure 2:
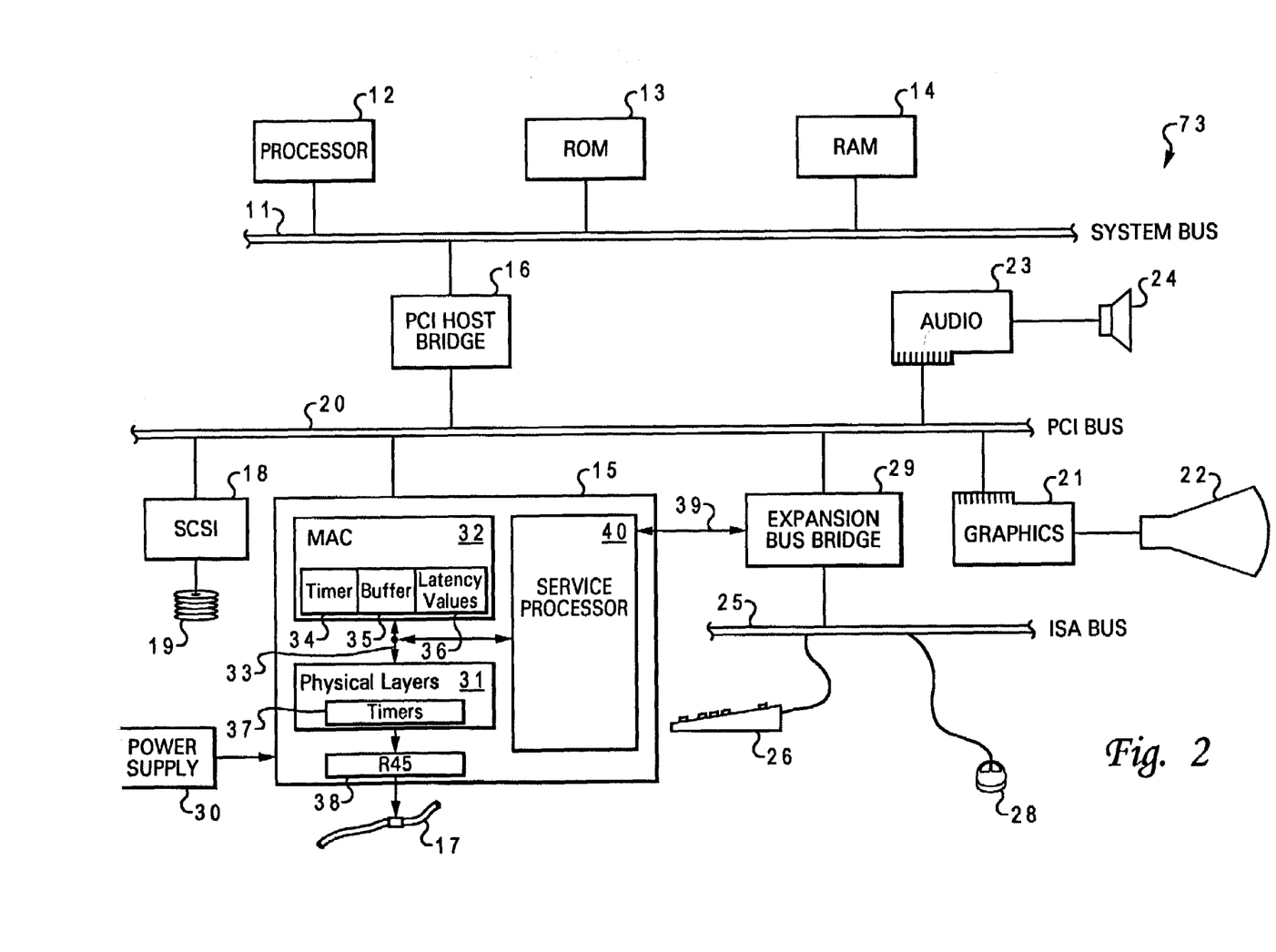
FIG. 2 is a block diagram of one of the client computer systems from FIG. 1, in accordance with a preferred embodiment of the present invention.

With reference now to FIG. 2, there is illustrated a block diagram of a client computer system, such as client computer system 73 from FIG. 1, in accordance with a preferred embodiment of the present invention. As shown, client computer system 73 includes a processor 12, a read-only memory (ROM) 13, and a random access memory (RAM) 14 connected to a system bus 11. Processor 12, ROM 13, and RAM 14 are also coupled to a peripheral component interconnect (PCI) bus 20 of client computer system 73 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14. In addition, an audio adapter 23 and a graphics adapter 21 may be attached to PCI bus 20. Graphics adapter 21 controls visual output through a video monitor 22 and audio adapter 23 controls audio output through a speaker 24. Also attached to PCI bus 20 is a network adapter 15 and a small computer system interface (SCSI) 18. Network adapter 15 connects client computer system 73 to a local-area network (LAN) 17. SCSI 18 is utilized to control a high-speed SCSI disk drive 19. Expansion bus bridge 29, such as a PCI-to-ISA bus bridge, may be utilized for coupling an industry standard architecture (ISA) bus 25 to PCI bus 20. As shown, a keyboard 26 and a mouse 28 are attached to ISA bus 25 for performing certain basic I/O functions.

Client computer system 73 further includes a power supply 30 for supplying full supply voltage to network adapter 15. Power supply 30 enables client computer system 73 to respond to a wake-up signal from network 17. In response to the receipt of a wake-up signal, power supply 30 is turned on and then powers up client computer system 73.

Network adapter 15 includes a physical layer 31 and a media access controller (MAC) 32 connected together utilizing a media independent interface (MII) bus 33. Physical layer 31 conditions analog signals to go out to network 17 via an R45 connector 38. Physical layer 31 receives parallel data from MII bus 33 and converts the received parallel data to serial data for transmission through R45 connector 38 and over to network 17. Physical layer 31 is also responsible for wave shaping and provides analog voltages to the network. Physical layer 31 includes auto-negotiation logic that serves at least three purposes as follows. First, it determines the capabilities of client computer system 73. Second, it advertises its own capabilities to server computer system 71 (from FIG. 1). Third, it establishes a connection with server computer system 71 using the highest performance connection technology.

MAC 32 of network adapter 15 processes digital network signals, and serves as an interface between a shared data path, i.e., MII bus 33 and PCI bus 20. MAC 32 performs a number of functions in the transmission and reception of data packets. For example, during the transmission of data, MAC 32 assembles the data to be transmitted into a packet with address and error detection fields. Conversely, during the reception of a packet, MAC 32 disassembles the packet and performs address checking and error detection. In addition, MAC 32 performs encoding/decoding of digital signals transmitted over the shared path and performs preamble generation/removal, as well as bit transmission/reception.

MAC 32 of network adapter 15 includes timers 34, buffer 35, and latency values 36. Timers 34 collect network data for client computer system 73 and time a particular network event. Buffer 35 stores the current size of the network buffer. Latency values 36 stores the current latency values. Timers 34, buffer 35, and latency values 36 may be modified remotely by server computer system 71 (from FIG. 1). Physical layer 31 also includes timers 37 that are utilized in a manner similar to timers 34.

Network adapter 15 also includes a service processor 40 coupled to MII bus 33. By coupling service processor 40 to MII bus 33, service processor 40 may send and receive packets from network 17 using physical layer 31. Data is accessed by service processor 40 over a system management bus 39. System management bus 39 is a preferably two-wire, low-speed serial bus used to interconnect management and monitoring devices.

Figure 3:
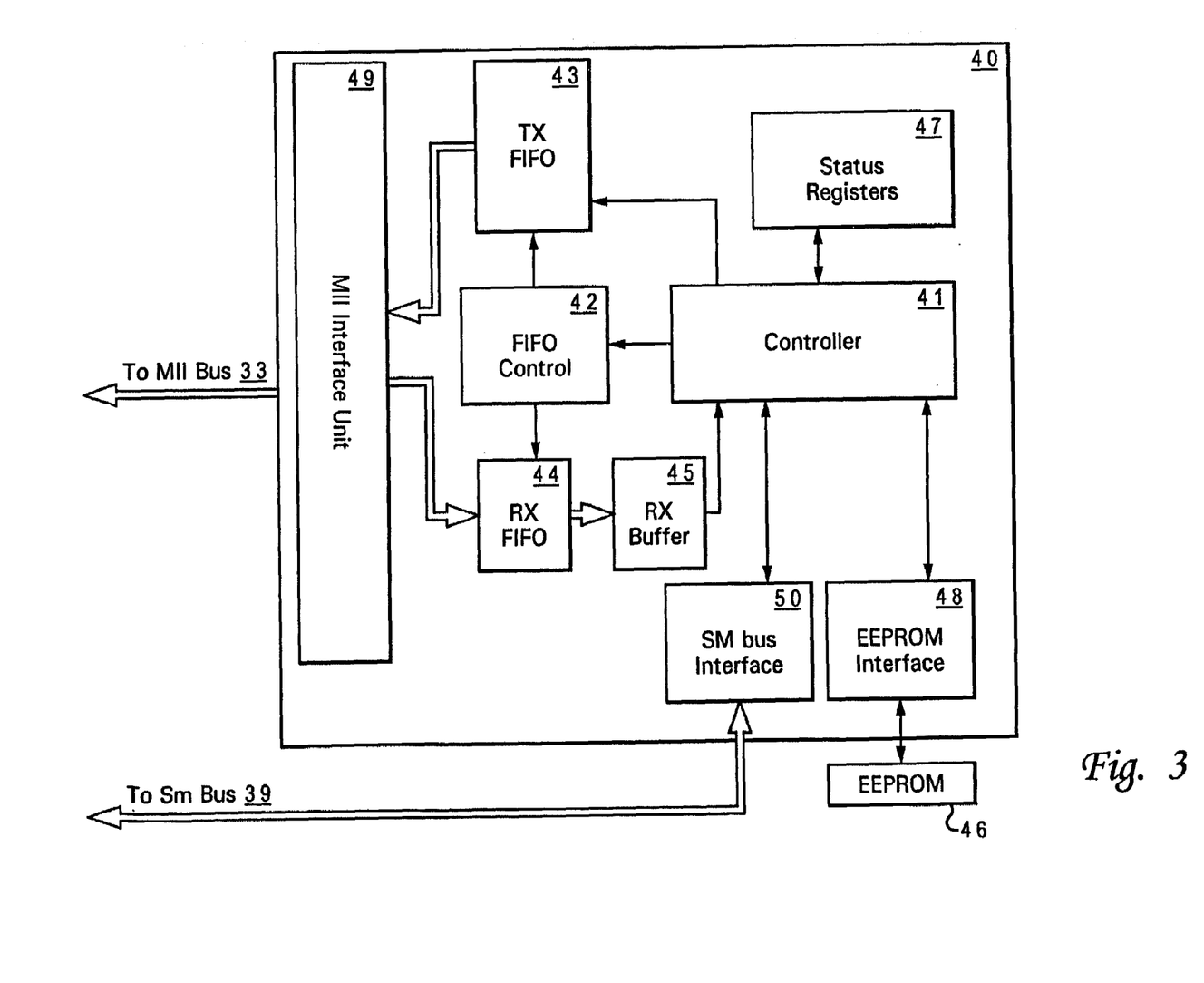
FIG. 3 is a block diagram of the service processor within a client computer system from FIG. 2, in accordance with a preferred embodiment of the present invention.

Referring now to FIG. 3, there is illustrated a detailed block diagram of service processor 40 from FIG. 2, in accordance with a preferred embodiment of the present invention. Service processor 40 includes a controller 41 having several state machines to handle tasks such as packet reception, service management bus interface, and updates for an EEPROM 46. Controller 41 sends commands to a FIFO control 42 to control data flow from a TX FIFO 43, RX FIFO 44, and RX buffer 45. Controller 41 also responds to service management bus requests from software running on client computer system 73 (from FIG. 1) to access a status register 47 or access EEPROM 46. Signals are received from MII bus 33 by MII interface unit 49 and passed to RX FIFO 44.

Controller 41 is coupled to expansion bus bridge 29 (from FIG. 2) via system management bus 39 through a service management bus interface 50. Service management bus 39 provides a path to allow software running on client computer system 73 to access service processor 40 and EEPROM 46. Controller 41 accesses EEPROM 46 through an EEPROM interface 48 to obtain values to generate network packets such as source and destination MAC addresses, IP protocol information, authentication headers, and Universal Data Packet headers.

Service processor 40 is always turned on. Service processor 40 is capable of sending ethernet packets to network 17 (from FIG. 2) without client computer system 73 being turned on. Service processor 40 also has an access ID area in EEPROM 46 which a user can store information about client computer system 73.

Figure 4A:
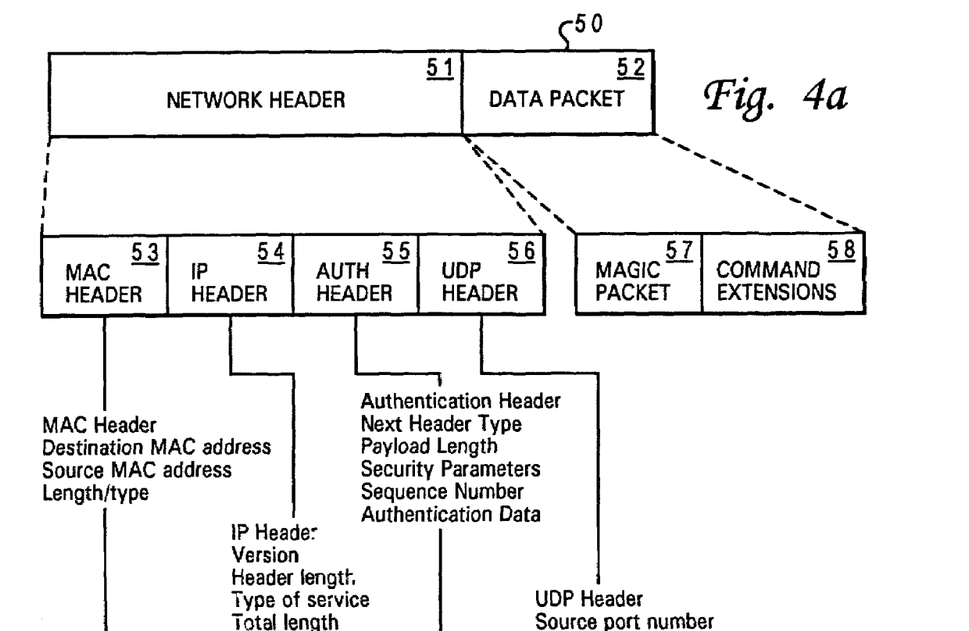
FIGS. 4a and 4b are pictorial representations of network packets utilized within the computer network from FIG. 1, in accordance with a preferred embodiment of the present invention.

With reference now to FIG. 4a, there is illustrated a pictorial representation of a first type of network packets, in accordance with a preferred embodiment of the present invention. As shown, a network packet 50, which may be transmitted by a server computer system over a computer network to a client computer system, includes a network header 51 and a data packet 52. Network header 51 includes a MAC header 53, an IP header 54, an authentication header 55, and an UDP header 56. Data packet 52 includes a magic packet 57 and command extensions 58. Magic packet 57 is six bytes of $FF_{hex}$ followed by 12 copies of client MAC addresses. Magic packet 57 is a management packet that does not include standard network data. When magic packet 57 is detected utilizing the six bytes of $FF_{hex}$, MAC 32 will ignore magic packet 57. Command extensions 58 includes commands that allows server computer system 71 to communicate with service processor 40.

Figure 4B:
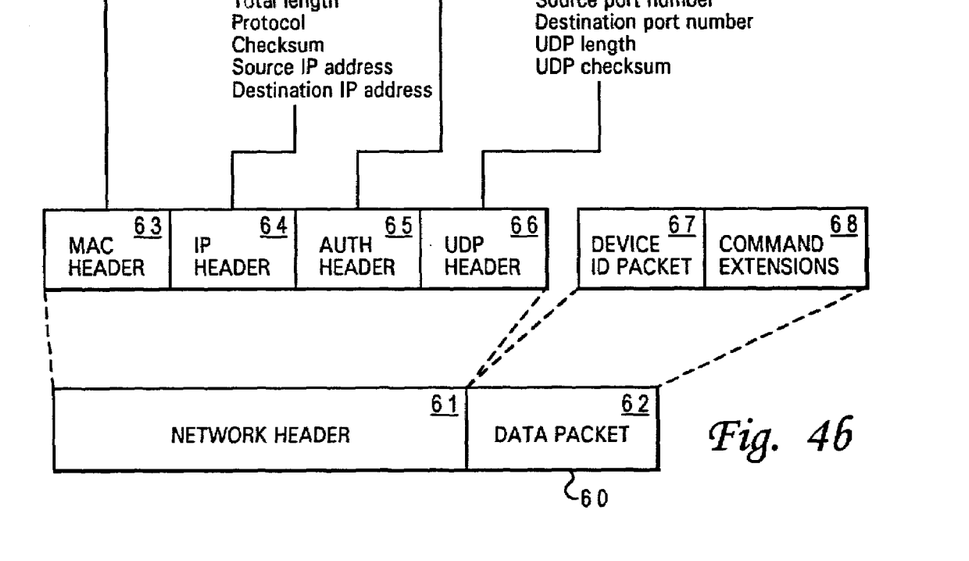

With reference now to FIG. 4b, there is illustrated a pictorial representation of a second type of network packets, in accordance with a preferred embodiment of the present invention. As shown, a network packet 60, which may be transmitted by a client computer system over a computer network to a server computer system, includes a network header 61 and a data packet 62. Similar to network packet 50 in FIG. 4a, network header 61 includes a MAC header 63, an IP header 64, an authentication header 65, and an user datagram protocol (UDP) header 66. Data packet 62 includes a device identifier packet 67 and command extensions 68. Device identifier packet 67 identifies a particular client computer system from which the packet is generated. Command extensions 68 includes a command that a client computer system may transmit to provide information about the client computer system.

During the installation of client computer system 73, the end date of the computer lease for client computer system 73 is entered into EEPROM 46 (from FIG. 3) of client computer system 73. During operation, a small program within client computer system 73 reads the end of lease date and compares the end of lease date to the current date on a regular basis. When the end of lease date falls within a predetermined amount of days (for example 30 days) from the current date, an alert is generated to indicate the lease for client computer system 73 is about to expire.

Figure 5:
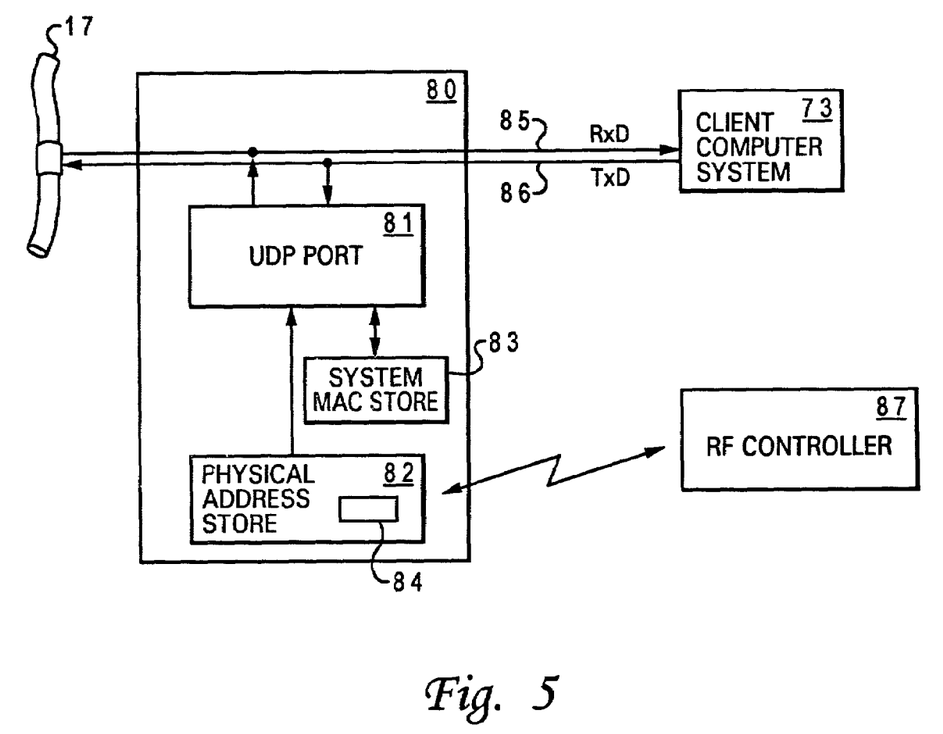
FIG. 5 is a block diagram of an Ethernet wall plate, in accordance with a preferred embodiment of the present invention.

The actual physical location of client computer system 73 can be determined by using a physical layer added within an Ethernet wall plate to which client computer system 73 is associated with at the time. The physical layer is designed to respond to a broadcast signal to a UDP port. Referring now to FIG. 5, there is illustrated a block diagram of an Ethernet wall plate in accordance with a preferred embodiment of the present invention. As shown, an Ethernet wall plate 80 includes a physical layer in the form of a UDP port 81, a physical address store 82, and a system MAC storage 83. Ethernet wall plate 80 couples client computer system 73 to network 17. Ethernet wall plate 80 transmits data from network 17 to client computer system 73, and vice versa. Client computer system 73 is connected to network 17 using an Ethernet receive data (RxD) line 85 and an Ethernet transmit data (TxD) line 86 via Ethernet wall plate 80. UDP port 81 receives data from physical address storage 82 and system MAC storage 83. System MAC storage 83 stores the MAC address of the Ethernet system of client computer system 73 connected to Ethernet wall plate 80 by snooping Ethernet TxD line 86 from client computer system 73. Ethernet TxD line 86 is active only when client computer system 73 is transmitting network packets. Each network packet contains the MAC address of a computer system connected to a corresponding Ethernet wall plate, and the MAC address of the client computer system comprises a unique number for that client computer system. For example, the MAC address of client computer system 73 comprises a unique number for client computer system 73. UDP port 81 parses the MAC address and stores the parsed MAC address in system MAC storage area 83. Because snooping occurs every time a network packet is transmitted on Ethernet TxD line 86, thus, if client computer system 73 is replaced, the MAC address of the new computer is captured and detected.

With a direct connection to UDP port 81, physical address storage 82 preferably includes a wireless radio-frequency (RF) interface 84. A hand held RF controller 87 is used to write in the physical location of Ethernet wall plate 80. The physical location information includes, for example, building number, floor, and office. Such information is written only when Ethernet wall plate 80 is physically inserted into a wall. After wall insertion, UDP port 81 contains the physical location of Ethernet wall plate 80 and the MAC address of client computer system 73 attached to Ethernet wall plate 80.

Accordingly, a UDP protocol is utilized by a software application in network 17 to send out a UDP command to a common UDP port number for the inventory function to every Ethernet wall plate of network 17. In a preferred embodiment, a UDP port number used for inventory applications can be reserved. Furthermore, the port number to the particular UDP port will then be assigned.

Accordingly, each of the wall plates that have the UDP port will send network packet containing the MAC address of the client computer system and the Physical Address of the Ethernet wall plate 80 when a command is provided from network 17. The additional physical layer is designed to respond to a broadcast signal to a UDP port. In so doing, the physical location of each client computer system can be determined.

Figure 6:
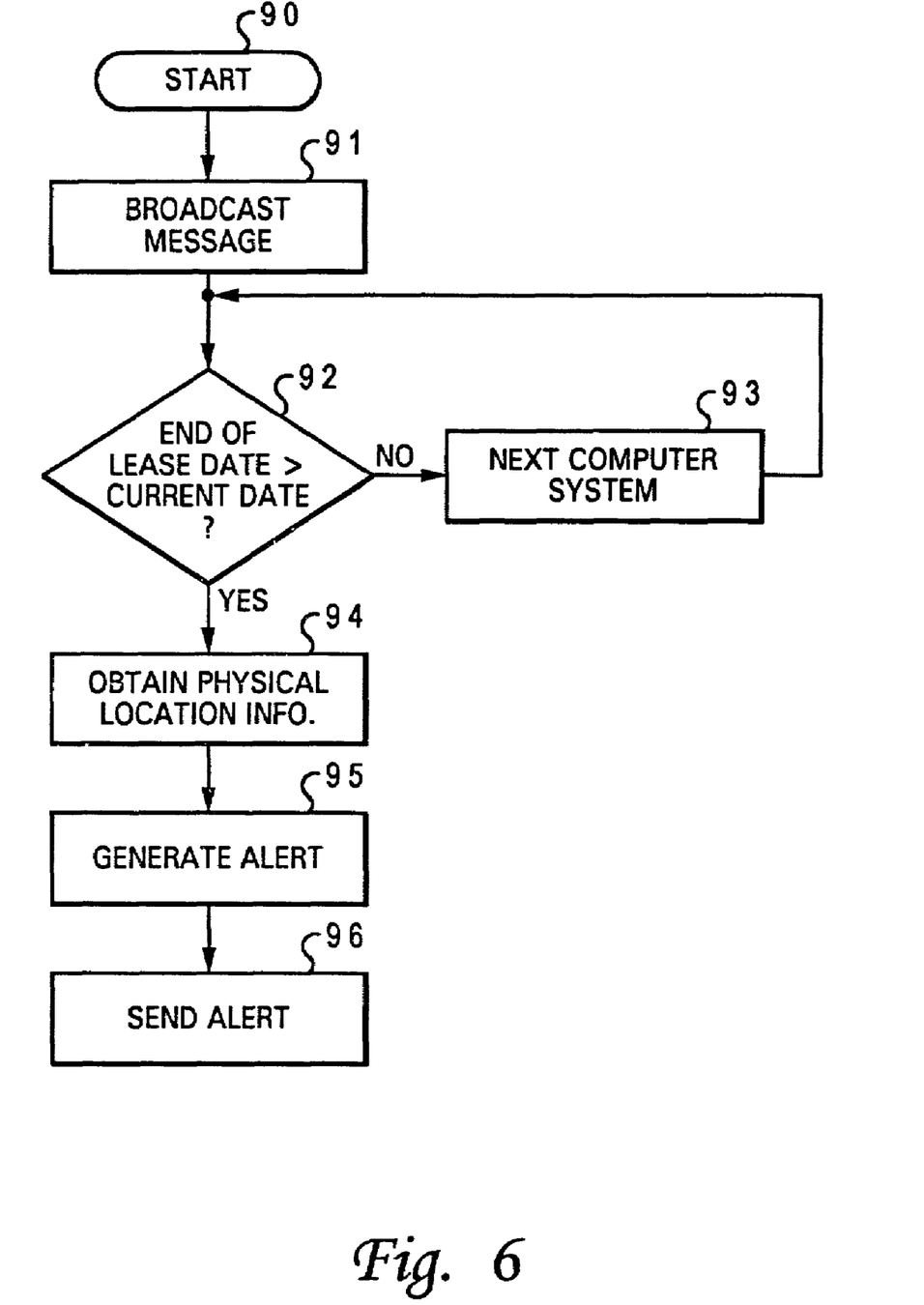
FIG. 6 is a high-level logic flow diagram of a method for providing automatic notification of an end of lease of a computer system and its location within the computer network of FIG. 1, in accordance with a preferred embodiment of the present invention.

With reference now to FIG. 6, there is illustrated a high-level logic flow diagram of a method for providing automatic notification of an end of lease of a computer system and its location, in accordance with a preferred embodiment of the present invention. Stating at block 90, a message is broadcasted from a server computer system to all client computer systems coupled to the server computer system within a computer network to inquire the lease status of each client computer system, as shown in block 91. At each client computer system, a determination is made as to whether or not the current date falls within a predetermined amount of days (for example 30 days) from the end of lease date for the corresponding client computer system, as depicted in block 92. If the current date does not fall within the predetermined amount of days from the end of lease date for that client computer system, the process proceeds to the next client computer system, as illustrated in block 93. Otherwise, if the current date falls within the predetermined amount of days from the end of lease date for that client computer system, the physical location of the client computer system is obtained from an Ethernet wall plate at which the client computer system is attached, as shown in block 94. Subsequently, an alert is generated to indicate that the lease for the client computer system is about to expire, as depicted in block 95. The physical location of the client computer system is preferably included within the alert. Finally, the alert is transmitted from the client computer system to the server computer system in the form of a data packet, as illustrated in block 96.

As has been described, the present invention provides an improved method and system for providing automatic notification of end of lease and locations of computers. The present invention automatically notice an information technology (IT) administrator when a computer lease is about to expired. The information include a serial number and a physical location of the computer.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing automatic notification of end of lease and location of a client computer system within a network, wherein said network includes a server computer system and a plurality of client computer systems, said method comprising:

sending a message from said server computer system to said plurality of client computer systems inquiring lease status of each of said plurality of client computer systems;

in response to said message from said server computer system, determining at one of said plurality of client computer system whether or not a current date falls within a predetermined amount of days from the end of lease date;

in response to a determination that said current date falls within said predetermined amount of days from the end of lease date for said client computer system, obtaining a physical location of said client computer system from an Ethernet wall plate at which said client computer system is attached by capturing a media access controller (MAC) address of said client computer system;

generating an alert message by said client computer system, wherein said alert message includes said physical location of said client computer system;

transmitting said alert message from said client computer system to said server computer system; and in response to a determination that said current date does not fall within said predetermined amount of days from the end of lease date for said client computer system, proceeding to a next client computer system.

2. The method of claim 1, wherein said method further includes receiving said physical location of said Ethernet wall plate via wireless radio-frequency interface.

3. A computer usable medium capable of storing computer program product for providing automatic notification of end of lease and location of a client computer system within a network, wherein said network includes a server computer system and a plurality of client computer systems, said computer usable medium comprising:

program code means for sending a message from said server computer system to said plurality of client computer systems inquiring lease status of each of said plurality of client computer systems;

program code means for determining at one of said plurality of client computer system whether or not a current date falls within a predetermined amount of days from the end of lease date in response to said message from said server computer system;

program code means for obtaining a physical location of said client computer system from an Ethernet wall plate at which said client computer system is attached by canturina a media access controller (MAC) address of said client computer system, in response to a determination that said current date falls within said predetermined amount of days from the end of lease date for said client computer system;

program code means for generating an alert message by said client computer system, wherein said alert message includes said physical location of said client computer system;

program code means for transmitting said alert message from said client computer system to said server computer system; and program code means for proceeding to a next client computer system, in response to a determination that said current date does not fall within said predetermined amount of days from the end of lease date for said client computer system.

4. The computer usable medium of claim 3, wherein said computer program product further includes program code means for receiving said physical location of said Ethernet wall plate via wireless radio-frequency interface.

5. A system for providing automatic notification of end of lease and location of a client computer system within a network, wherein said network includes a server computer system and a plurality of client computer systems, said system comprising:

means for sending a message from said server computer system to said plurality of client computer systems inquiring lease status of each of said plurality of client computer systems;

means for determining at one of said plurality of client computer system whether or not a current date falls within a predetermined amount of days from the end of lease date in response to said message from said server computer system;

means for obtaining a physical location of said client computer system from an Ethernet wall plate at which said client computer system is attached by capturing a media access controller (MAC) address of said client computer system, in response to a determination that said current date falls within said predetermined amount of days from the end of lease date for said client computer system;

means for generating an alert message by said client computer system, wherein said alert message includes said physical location of said client computer system;

means for transmitting said alert message from said client computer system to said server computer system; and means for proceeding to a next client computer system, in response to a determination that said current date does not fall within said predetermined amount of days from the end of lease date for said client computer system.

6. The system of claim 5, wherein said system further includes means for receiving said physical location of said Ethernet wall plate via wireless radio-frequency interface.

* * * * *